(12) United States Patent
Nakazawa

(10) Patent No.: US 12,267,216 B2
(45) Date of Patent: Apr. 1, 2025

(54) MANAGEMENT DEVICE, CONTROL METHOD FOR MANAGEMENT DEVICE, AND STORAGE MEDIUM THAT PROVIDE A MAP OF SELECTABLE NETWORK DEVICES

(71) Applicant: CANON KABUSHIKI KAISHA, Tokyo (JP)

(72) Inventor: Toshiyuki Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 18/177,358

(22) Filed: Mar. 2, 2023

(65) Prior Publication Data
US 2023/0291659 A1 Sep. 14, 2023

(30) Foreign Application Priority Data
Mar. 10, 2022 (JP) .................... 2022-037502

(51) Int. Cl.
*H04L 41/22* (2022.01)
*G06F 3/0482* (2013.01)
(Continued)

(52) U.S. Cl.
CPC ............ *H04L 41/22* (2013.01); *G06F 3/0482* (2013.01); *G09B 29/006* (2013.01);
(Continued)

(58) Field of Classification Search
CPC ....... H04L 41/22; H04L 41/084; H04L 41/12; G06F 16/29; G06F 3/0482; G06F 3/048;
(Continued)

(56) References Cited

U.S. PATENT DOCUMENTS 6,181,341 B1 * 1/2001 Shinagawa ............. H04L 41/12
709/224
7,849,174 B2 * 12/2010 Kawashima ............ H04L 41/12
715/737
(Continued)

FOREIGN PATENT DOCUMENTS

JP 2000194626 A 7/2000
JP 2003216396 A 7/2003
(Continued)

*Primary Examiner* — Nicholas Ulrich
(74) *Attorney, Agent, or Firm* — Rossi, Kimms & McDowell LLP

(57) ABSTRACT

A management device, a control method thereof, and a storage medium storing a program manage network devices. Map information is managed by assigning attribute information thereto, information for a network device (management target) is managed by assigning attribute information thereto, and user information is managed by assigning attribute information thereto. When the map information becomes a placement target for a placement operation for a network device corresponding to a map selected, map information that has been assigned attribute information that does not corresponding to the attribute information for the network device is prevented from being selected. Information (Continued)

for a network device is displayed on a display device displaying a map based on the results of the placement operation using user selected map information.

10 Claims, 13 Drawing Sheets

(51) Int. Cl.
 *G09B 29/00* (2006.01)
 *H04L 41/084* (2022.01)
 *H04L 41/12* (2022.01)

(52) U.S. Cl.
 CPC ............ *G09B 29/007* (2013.01); *H04L 41/12* (2013.01); *H04L 41/084* (2013.01)

(58) Field of Classification Search
 CPC ............... G06F 16/9537; G06F 16/909; G06F 3/04842; G06F 3/04817; G06F 3/0486; H04W 8/00; H04W 64/003; G09B 29/006; G09B 29/007
 See application file for complete search history.

(56) References Cited

U.S. PATENT DOCUMENTS

| | | | | |
|---|---|---|---|---|
| 7,877,729 | B2* | 1/2011 | Amemiya | H04L 41/12 |
| | | | | 715/224 |
| 8,869,034 | B2* | 10/2014 | Yamashita | H04L 67/125 |
| | | | | 715/734 |
| 9,442,911 | B2* | 9/2016 | Hagiwara | G06F 3/04842 |
| 2004/0070673 | A1* | 4/2004 | Nakamura | H04N 13/161 |
| | | | | 348/E13.044 |
| 2005/0165922 | A1* | 7/2005 | Hatano | H04L 41/12 |
| | | | | 709/223 |
| 2014/0114931 | A1* | 4/2014 | Cline | G06Q 30/0259 |
| | | | | 707/754 |

FOREIGN PATENT DOCUMENTS

| | | |
|---|---|---|
| JP | 2004355503 A | 12/2004 |
| JP | 2006201865 A | 8/2006 |
| JP | 2020140601 A | 9/2020 |
| JP | 2020199324 A | 12/2020 |
| WO | 2016189645 A1 | 12/2016 |

\* cited by examiner

FIG. 8

Device list

All devices ▼  — 802

| Device name | Product name | Address | Installation location | Region |
|---|---|---|---|---|
| HQ5FNE_iRC5000 | iRC 5000 | 192.168.10.12 | ❶ Head office 3F North | Portugal |
| HQ5FNW_LBP2000 | LBP 2000 | 192.168.10.16 | ❶ Head office 3F South | Portugal |
| HQ5FSE_iR6000 | iR 6000 | 192.168.5.134 | Paris branch | France |
| HQ7FNW_iRC4000 | iR C4000 | 192.168.7.173 | Factory | England |

801

MANAGEMENT DEVICE, CONTROL METHOD FOR MANAGEMENT DEVICE, AND STORAGE MEDIUM THAT PROVIDE A MAP OF SELECTABLE NETWORK DEVICES

BACKGROUND OF THE INVENTION

Field of the Invention

The present invention relates to a function for displaying a device on a map in a system that manages devices that have been connected to a network.

Description of Related Art

Conventionally, in systems that manage devices that have been connected to a network, there is a technology that performs a display such that the location in which the network device is actually installed can be intuitively understood. Japanese Unexamined Patent Application, First Publication No. 2000-194626 discloses a technology in which a map image is registered in a system, and a device that is the management target from a device list is placed on a map and the position is indicated by an operation such as a drag and drop using a mouse, or the like.

However, in the technology in Japanese Unexamined Patent Application, First Publication No. 2000-194626, if the number of devices that have been connected to the network that is the management target and the number of maps increase, when selecting a map to be assigned to a device, it is necessary to search for and select the desired map from a large number of maps, which becomes a burden for the user.

SUMMARY OF THE INVENTION

The present invention reduces the work load of a user in a system that manages devices by placing them on maps.

The management device of the present invention is a management device that manages a network device, comprising: a memory storing instructions; and a processor executing the instructions causing the monitoring device to manage map information by assigning attribute information thereto; manage information for a network device that is a management target by assigning attribute information thereto; perform control such that when map information is selected to become a placement target for a placement operation for a network device in relation to a map, it is not possible to select map information that has been assigned attribute information that does not correspond to attribute information for this network device; and display information for a network device on a map based on the results of the placement operation using map information that has been selected by a user.

Further features of the present invention will become apparent from the following description of exemplary embodiments with reference to the attached drawings.

BRIEF DESCRIPTION OF THE DRAWINGS

FIG. 8 is a diagram showing one example of a display screen for a list of management target devices.

DETAILED DESCRIPTION OF THE INVENTION

First Embodiment

Figure 1:
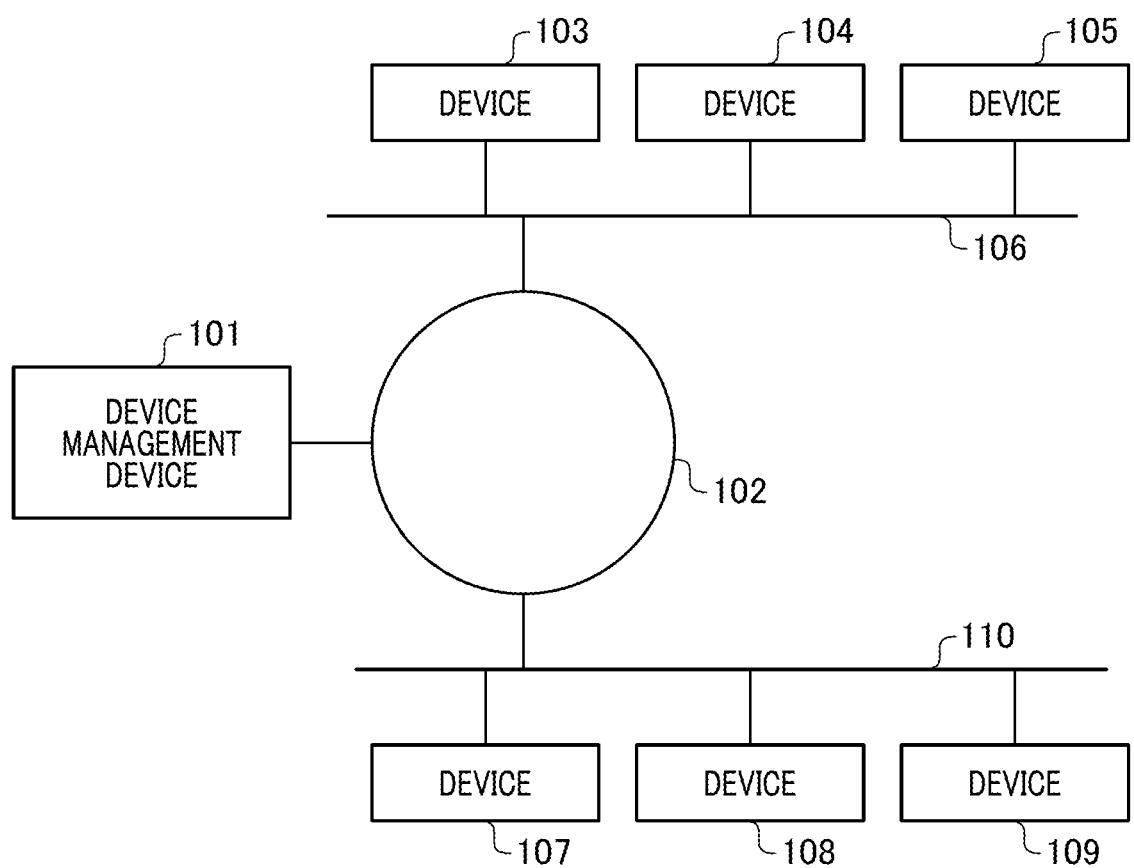
FIG. 1 is a diagram showing a configuration of a device management system.
Figure 2:
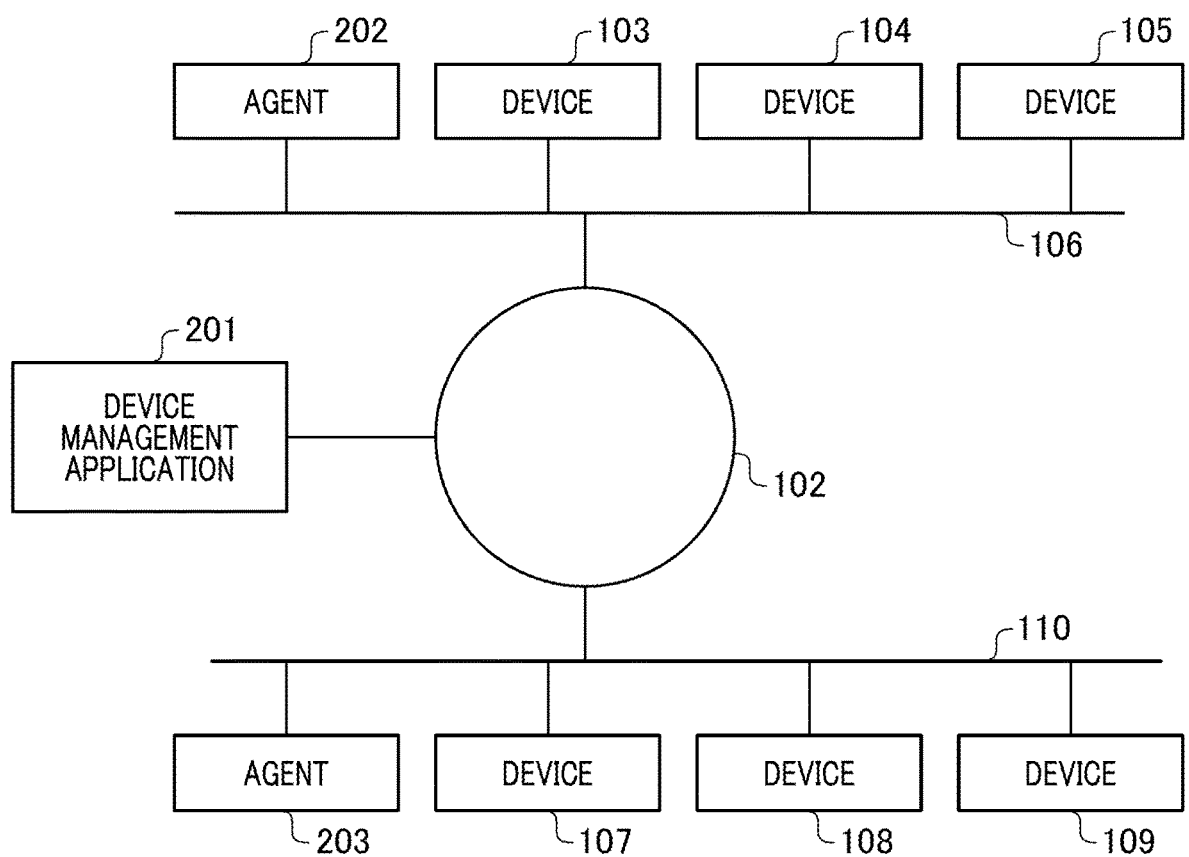
FIG. 2 is a diagram showing a configuration of a device management system.

FIG. 1 and FIG. 2 are diagrams showing one example of a configuration of a device management system. First, the example of the configuration of a device system management that is shown in FIG. 1 will be explained. The device management system has a device management device 101 that manages network devices that have been connected to a network, a network device that is the management target of the device management device 101, and a network that communicably connects these.

The network device is a device that is managed by the device management device 101. It is sufficient if the network device is, for example, a device that is able to communicate via a network, such as a PC, an image forming apparatus, or the like. Below, network device will simply be written as device. In the present embodiment, an example will be explained in which a device 103, a device 104, a device 105, a device 107, a device 108, and a device 109 are the management targets of the device management device 101.

The device management device 101 is an information processing device that provides a device management service that manages devices via a network. The device management device 101 responds to user commands, communicates with each device via networks 102, 106, and 110, acquires the state of each device, and changes the setting values for each device. In addition, the device management device 101 manages devices by placing them on maps. Note that although in the present embodiment, an example is explained in which a device management service is provided by the device management device 101, the present invention is not limited thereto. In addition to being provided by one or more information processing devices, the functions provided by the device management device 101 may also be realized by a virtual machine (a cloud service) that uses resources that have been provided by a data center including an information processing apparatus, or a combination thereof. In addition, the functions provided by the device management device 101 may also be realized by a device management application.

The device management device 101 is connected to each device via a network 102, and subnets (a subnet 106 and a subnet 110) that are connected to the network 102. The device 103, the device 104, and the device 105 are connected to the subnet 106, and the device 107, the device 108, and the device 109 are connected to the subnet 110. Note that it is sufficient if the device management device 101 and each device are communicably connected, and the network configuration is not limited thereto. In addition, the network may also be configured by any of a communication network such as a LAN or a WAN, a cellular network (for example, LTE, 5G, or the like), a wireless network, a telephone circuit, a digital leased line, or the like, or a combination thereof. That is, it is sufficient if the network that connects the device management device 101 to the management target devices is configured so as to be able to send and receive data, and any system may be used for the communication system.

Next, the example of the configuration of the device management system that is shown in FIG. 2 will be explained. With respect to the configuration of the device management system that is shown in FIG. 2, the differences from that in FIG. 1 will be explained, while configurations that are the same as those in FIG. 1 will be given the same reference numerals, and explanations thereof will be omitted. The device management system has a device management application 201 that manages network devices that have been connected to a network, network devices that are the management target, a plurality of agent applications, and a network that communicably connects these.

The device management application 201 is an application that provides a device management service that manages devices via a network, and has functions related to device management that are the same as those of the device management device 101. An agent 202 and an agent 203 are both agent applications that manage a portion of the devices from among the devices that are the management targets of the device management application 201. The agent 202 is connected to the subnet 106, and manages the device 103, the device 104, and the device 105. The agent 203 is connected to the subnet 110, and manages the device 107, the device 108, and the device 109. In order to perform load distribution in a large-scale environment, the device management application 201 sends processing commands to the agent 202 and the agent 203 rather than to individual devices. The agent 202 and the agent 203 respond to the commands received from the device management application 201, send processing commands to each of the managed devices by communicating with them, and send the processing results for each device to the device management application 201. Note that although in the present embodiment, each agent is placed within the same subnet as the management target devices, it is not necessary to place them on the same subset. In addition, it is also possible to place the device management application 201 on the internet.

Figure 3:
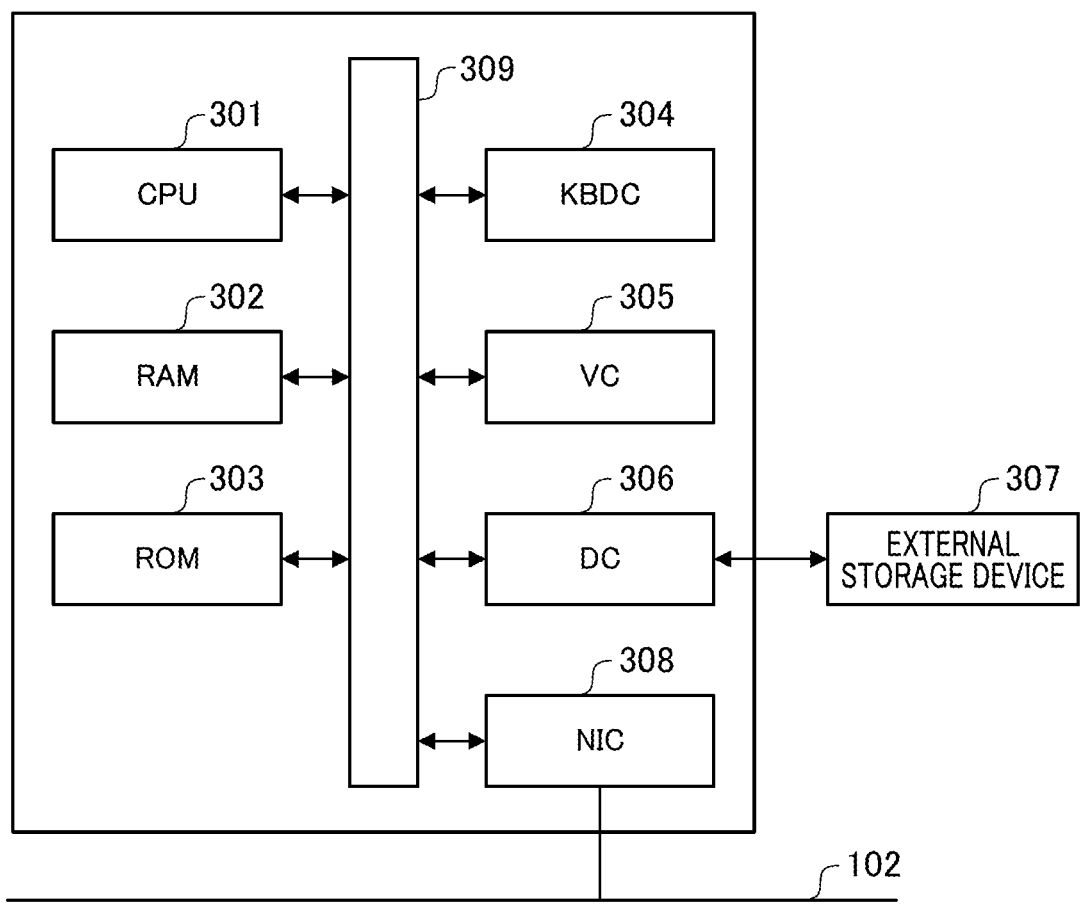
FIG. 3 is a diagram showing a hardware configuration of a device management device.

FIG. 3 is a diagram showing the hardware configuration of the device management device 101. In addition, the host computer on which the device management application 201 and each agent application operate has the same configuration as the device management device 101. The device management 101 is provided with a CPU 301, a RAM 302, a ROM 303, and an external storage device 307. The CPU 301 manages the entirety of the device management device 101.

The CPU 301 loads and executes a program that has been stored on a memory (the ROM 303 or the external storage device 307) on the RAM 302 according to necessity, and integrally controls each unit that has been connected to a system bus 309. In addition, the CPU 301 may also integrally control each unit that has been connected to the system bus 309 by loading and executing a software (a program) that was downloaded via a network on the RAM 302 according to necessity. The RAM 302 (Random Access Memory) is a data readable/writable memory, and functions as a primary memory or working area and the like of the CPU 301. The ROM (Read Only Memory) 303 is a data reading dedicated memory, and, for example, stores a basic control program or the like for the device management device 101. The external storage device 307 is a memory such as a hard disk drive (HD), a solid-state drive (SSD), or the like. The external storage device 307 stores a boot program, an operating system (OS), an authentication server, each type of application including an authentication client, or the like, database data, user files, and the like.

A KBDC 304 controls input to the device management device 101. The KBDC 304 sends information that is input by an input device such as a keyboard and a pointing device, or the like, which are not illustrated, a virtual keyboard, audio, or the like, to the CPU 301, and controls the input to the device management device 101. A VC305 is a video controller, and controls the display to a display device, which is not shown. The display device may be, for example, an LCD (Liquid Crystal Display), or may also be a head mounted display or the like that is able to display a VR (virtual reality). A DC306 is a display controller, and controls the access to the external storage device 307. An NIC 308 is a communication controller, and the device management device 101 is connected to the network 102 via the NIC 308. The CPU 301 is connected to the network 102 via the NIC 308, and enables data communication with each device on the network.

Figure 4:
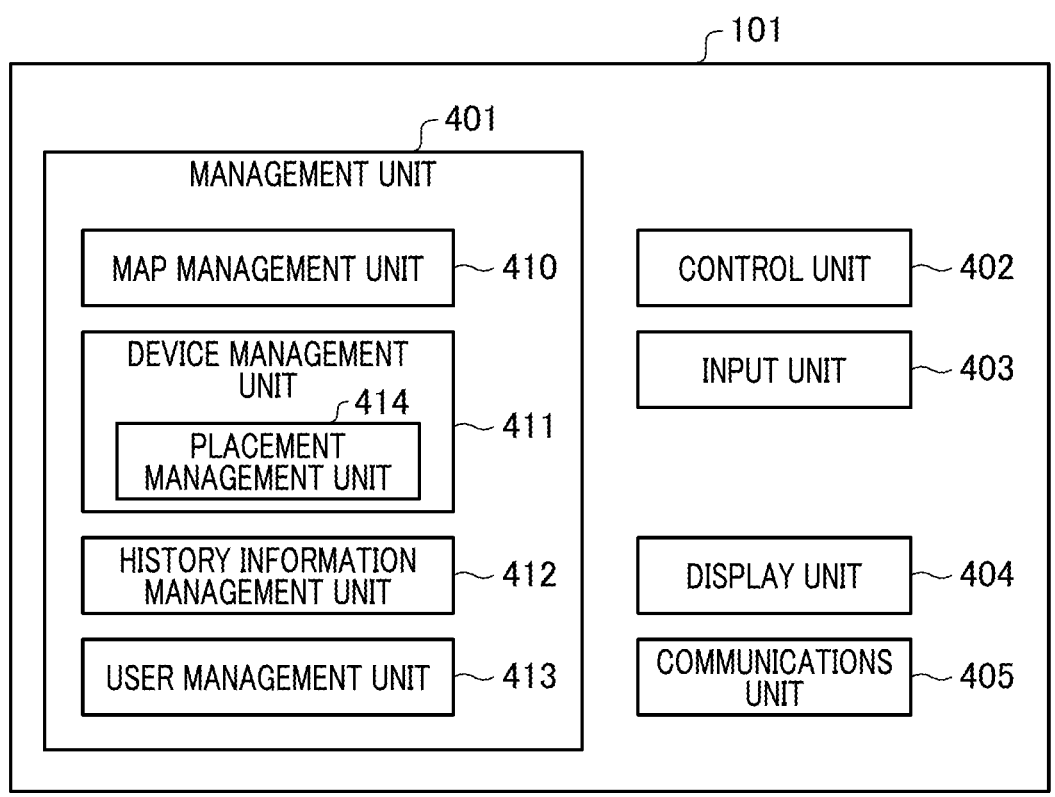
FIG. 4 is a diagram showing a software configuration a device management device.

FIG. 4 is a diagram showing the software configuration of the device management device 101. The device management device 101 has a management unit 401, a control unit 402, an input unit 403, a display unit 404, and a communications unit 405. The control unit 402 controls the entirety of the device management device 101. For example, the control unit 402 controls the placement of devices on maps based on information that is managed by the management unit 401, and controls the display contents for the UI. The input unit 403 performs the reception of user operations on the device management device 101. The display unit 404 controls the VC305, and controls the display of the UI, the maps, and the like on the display device. The communications unit 405 controls the communications with external devices such as the device 103 and the like, and external systems.

The management unit 401 manages data that the device management device 101 stores. The management unit 401 has a map management unit 410, a device management unit 411, an attribute information management unit 412, and a user management unit 413. The map management unit 410 serves as a first management means and manages the map information for the map on which a device is placed. The device management unit 411 serves as a second management means, and manages information for the network devices that the device management device 101 manages. In addition, the device management unit 411 has a placement management unit 414. The placement management unit 414 manages the correspondence relationship between a device and the map on which this device has been placed. The attribute information management unit 412 manages attribute information, which is to be described below. The user management unit 413 serves as a third management means and manages information for users who use the device management service and are managers who manage the devices.

The device management device 101 has a function that displays where a device is placed on a map. In order to display the device on the map, a placement operation that places the device on the map in advance is necessary. When placing a device on a map, if the number of devices and the number of maps becomes large, it takes time for the user to search for the desired device and map. In this context, the present embodiment assigns attribute information to the map information and device information, and when a device is placed on a certain map, control is performed such that only a device having the same attribute information as the map is placed thereon.

Figure 5A:
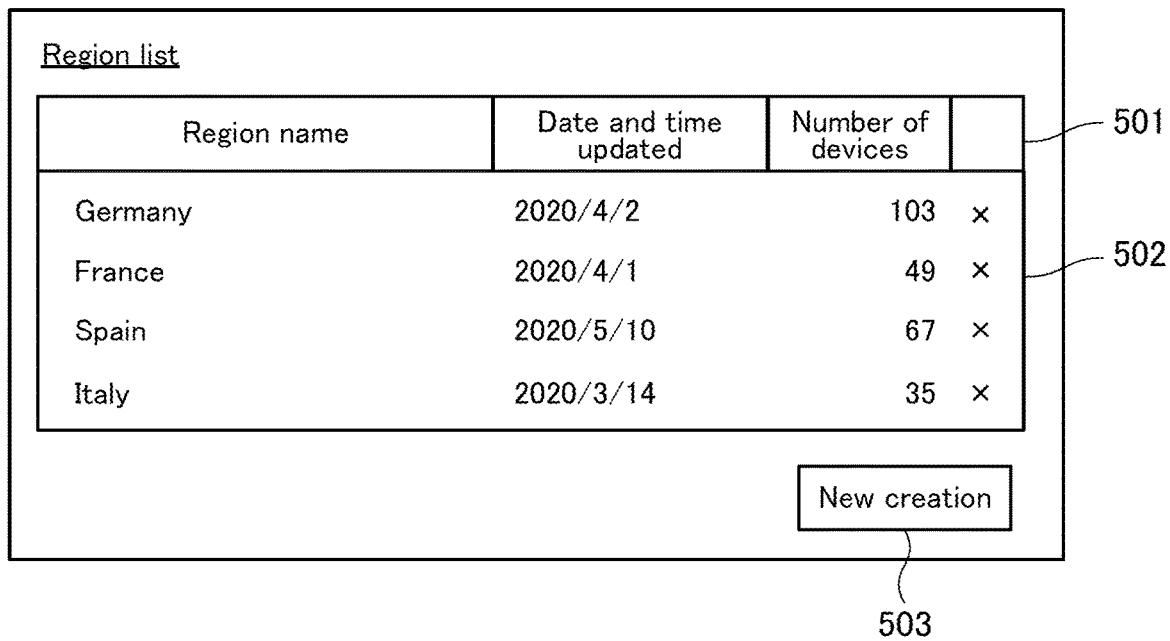
FIG. 5A and FIG. 5B are diagrams showing one example of a screen for setting a region.
Figure 5B:
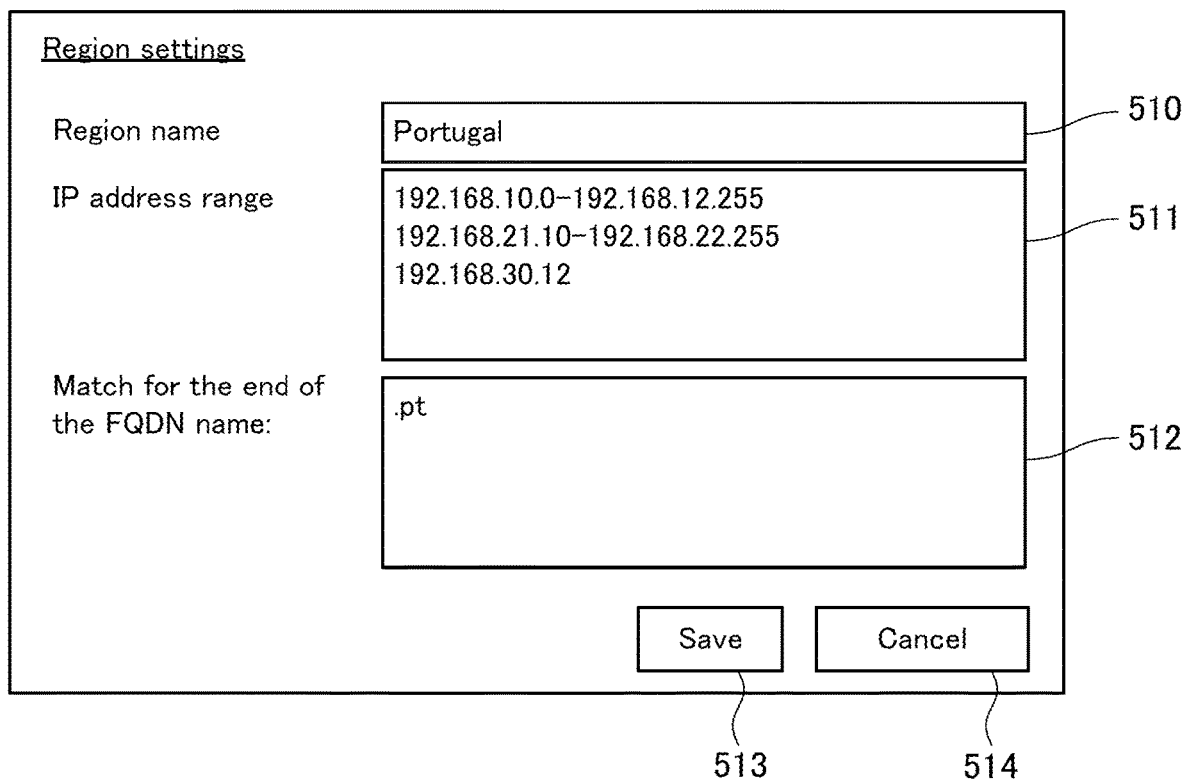

In the present embodiment, an example is explained in which information that indicates a region is assigned to serve as the attribute information. A region is information that indicates a region, and for example, responsibility regions or the like are set per country and prefecture, or business location. FIG. 5A and FIG. 5B are diagrams showing one example of screens for setting a region. FIG. 5A is a diagram showing a list of regions that have already been set. In the list 501 of regions that have already been created, for example, the name of the region defined by the user, the date and time at which the region was last edited, and the number of devices that belong to the region are displayed as the information for each region. In this context, the regions that have been listed are set by the maps and devices that will be explained below.

A delete button 502 is a button for deleting a selected region. Upon detecting that the delete button 502 has been pressed by a user, the device management device 101 displays a dialogue, which is not illustrated, for confirming the deletion, and upon detection of deletion confirmation by the user, this region is deleted from the database. Next, the device management device 101 changes the value that indicates the region for the device information and the map information that are assigned to the deleted region to a value that indicates "unassigned".

A new creation button 503 is a button for creating information that indicates a new region. Upon detecting that the new creation button 503 has been pressed, the device management device 101 displays a region editing screen. In addition, the device management device 101 also displays a region editing screen corresponding to information indicating a region for a selected row in the case in which it has been detected that a row of the region list 501 has been clicked. Information that indicates a region is set in the device information and map information that indicate each device of the management targets of the device management device 101, and any one of the regions that are displayed in the region list 501, or "unassigned", which means that this information does not belong to any region, is assigned thereto.

FIG. 5B is a diagram showing the region editing screen. The region editing screen is displayed by the user either clicking on a row of the region list 501, or clicking on the new creation button 503. It is possible to, for example, set a region name 510, an IP address range 511, and a character string 512 that matches the end of an FQDN name on the region editing screen. In the case in which the display has transitioned to the region editing screen by a row of the region list 501 being clicked, the device management device 101 displays the values that have been set for this region in each of the region name 510, the IP address range 511, and the character string 512 that matches the end of an FQDN name.

The region name 510 is set to a name that indicates a region, such as, for example, "Portugal", which is the name of a country. In the IP address range 511, a range of IP V4 addresses for a device that belongs to the region is set. The address range is input in, for example, the format of an "address", the "start address—completion address", or the "address/mask length". Multiple rows can be input in the range of the IP V4 address. A character string that matches the end an FQDN name of a device that belongs to a region is set in the character string 512 that matches the end of an FQDN name (fully qualified domain name). Multiple rows can be input for the character string that matches the end of an FQDN name. In addition, the region editing screen also displays a save button 513 that saves the region settings that have been edited on the editing screen, and a cancel button 514 that returns the display to the region list screen without saving the edits on the editing screen.

Upon detecting that the save button 513 has been pressed by a user, the device management device 101 checks if the address range that has been input to the IP address range 511 overlaps with the IP V4 address ranges that are set for the other regions. In the case in which an address range overlap is detected, the device management device 101 displays a warning on the editing screen that indicates that the address range is being used twice. In contrast, in the case in which an overlap is not detected, the device management device 101 saves the settings that have been input on the editing screen to the database. Note that it is also possible for the device management device 101 to check for overlapping address ranges when the input of the IP address range 511 on the region editing screen is completed, and to set the save button 513 as being unusable in the case in which there is a region overlap.

After the settings that have been input on the editing screen are saved to the database, the device management device 101 sets the region for the device that fulfills the input conditions (the address range or the match for the end of the FQDN name) as the created or edited region. Upon the editing on the region editing screen being completed, the save button 513 being pressed, and the saving of the post-editing region settings to the database and the changing of the settings for the region for the corresponding device being completed, the display transitions to the region list screen in FIG. 5A.

The table 1 is one example of a table for a database that stores information indicating regions. The items that are shown in the column names, and the values therefor in the Table 1 are stored in the table for the information indicating the regions. The definitions in the table are the definitions of the values corresponding to each column name. The information that indicates the regions is managed by the attribute information management unit 412.

TABLE 1

| Column Name | Definition |
| --- | --- |
| RegionId | uniqueidentifier, Primary Key |
| Name | nvarchar (200) |
| IPV4Addresses | nvarchar (4000) |
| FQDNs | nvarchar (4000) |
| LastModified | datetime |

In table 1, RegionId is an identifier for uniquely identifying information that indicates a region. Name is an item indicating the region name. The value that the Name indicates is the value that has been input into the region name 510 on the region editing screen (FIG. 5B). IPV4Addresses is an item that indicates the range of IP addresses for the region. The values that the IPV4Addresses indicate are the values that have been input into the IP address range 511. FQDN is an item that indicates a string of characters that matches the end of an FQDN name for a device that belongs to the region. The values that the FQDN indicates are the values that have been input into the character string 512 that matches the end of an FQDN name. LastModified is the date and time at which the information indicating this region was last edited. Note that a row that means "unassigned" is inserted into the table for the information indicating the regions in advance. The device management device 101 does not display data for the regions that indicate "unassigned" in the region list 501 in FIG. 5A.

Table 2 is one example of a table for a database that stores information for devices that are management targets. The items that are indicated in the column names and the values therefor in the Table 2 are stored in the database that stores device information. The information for the devices that are management targets is managed by the device management unit 411.

TABLE 2

| Column Name | Definition |
| --- | --- |
| DeviceId | uniqueidentifier, Primary Key |
| Name | nvarchar (200) |
| ProductName | nvarchar (200) |
| Manufacturer | nvarchar (200) |
| DeviceType | nvarchar (20) |
| IPV4Address | Int |
| Hostname | nvarchar (300) |
| Location | nvarchar (200) |
| Status | Int |
| RegionId | uniqueidentifier, Foreign Key |
| LastModified | Datetime |

DeviceId is an identifier for uniquely identifying a device. Name is the name that the user has set for a device. ProductName is the product name for a device. Manufacturer is the manufacturer of the device. DeviceType is the type of device, and stores, for example "printer", "mfp" (multifunction peripheral), or the like. IPV4Address is the IP V4 address for the device.

Hostname is the FQDN name for the device. In the case in which an FQDN name is not set in the device, an empty string is set as the Hostname. Location is the installation location of the device that has been set by the user. Status is an item indicating the current state of the device. For example, one of the following values indicating the present state of the device is stored as the Status:

0: normal operations
1: critical error
2: error
3: warning
4: power off
5: not responding.

RegionId is attribute information that is assigned to the device information. The RegionId is the RegionId for the region to which the device belongs. The RegionId for the device information is set by the device management device 101 based on the region settings (the address range (IPV4Addresses) and FQDN name (FQDNs) from the Table 1). The RegionId for devices that do not belong to the settings for any of the regions that are managed are set as a value that indicates that the region is "unassigned". Note that these are one portion of the information that is saved on the table for the device information, and an even greater amount of information is stored on the table for the device information. In addition, information that indicates whether or not three-dimensional representation is possible may also be included to serve as the attribute information in the device information.

Figure 6A:
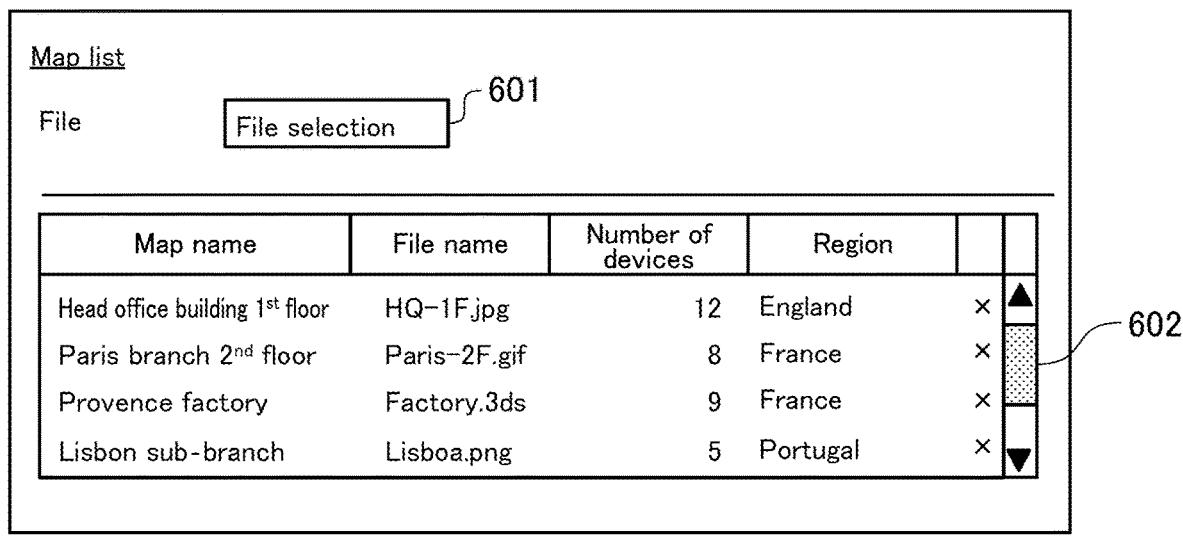
FIG. 6A and FIG. 6B are diagrams showing one example of a screen for setting a map.
Figure 6B:
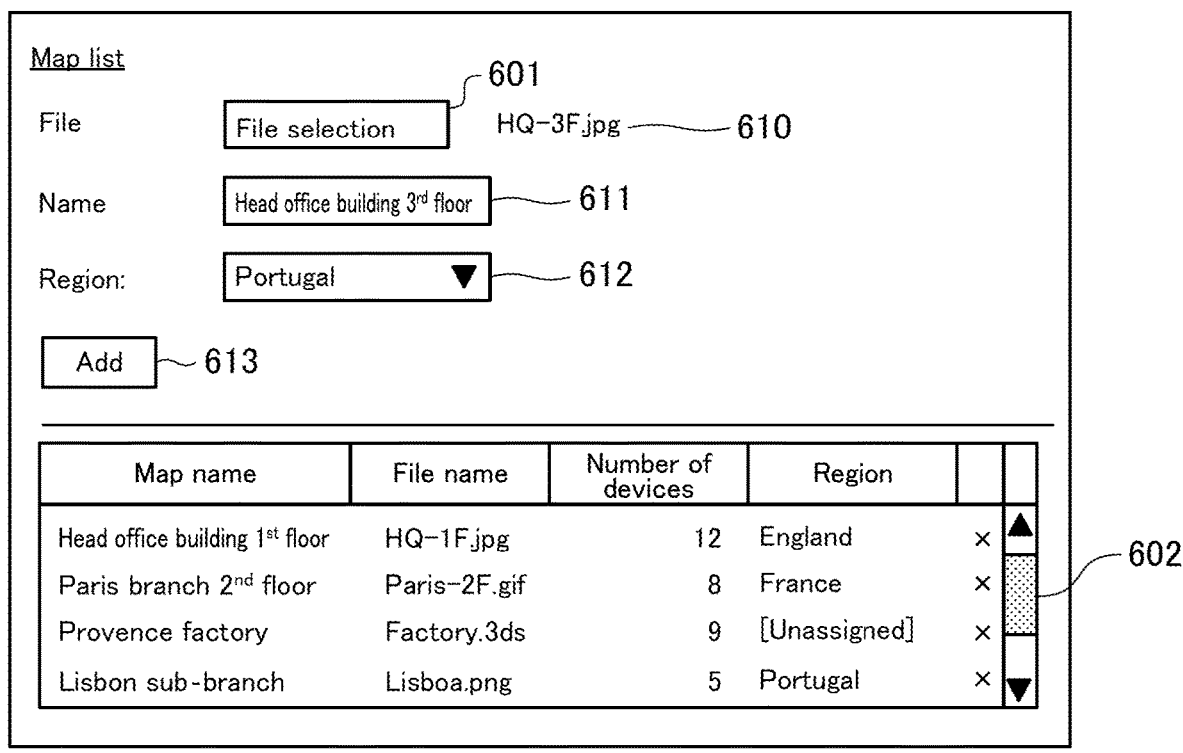

FIGS. 6A and 6B are diagrams showing one example of a screen for setting a map. FIG. 6A is a diagram showing a list of maps that have already been registered in the device management device 101. The map list 602 is a list of the maps that have already been registered in the device management device 101. The map list displays, for example, the name of a map that has been designated by the user, the file name for the image file for the map, the number of devices that are assigned to the map, the region names for the regions that are assigned to the map, and a delete button for deleting the map. The device management device 101 displays, for example, the number of devices that are assigned to a map based on a database (Table 4) that stores the map assignments for the devices.

Upon detecting that the delete button has been pressed by the user, the device management device 101 displays a dialogue that confirms the deletion of this map, and deletes this map from the Table 3, which will be described below, due to the detection of confirmation of deletion by the user. At the same time, the device management device 101 deletes the row with the MapId that matches the MapId for the map that is the deletion target from the Table 4, which will be described below.

A file selection button 601 is a button for selecting the image for a map to be added. The user is able to start a new registration for a map by pressing the file selection button 601. Upon detecting that the user has pressed the file selection button 601, the device management device 101 opens the file selection screen for an OS or a web browser, and prompts the user to select a map file. Upon a map file being selected by the user, the device management device 101 prompts the user to input the name for the map that corresponds to this map file, and to select the regions that will be assigned thereto.

FIG. 6B is a diagram showing one example of a new map registration screen. FIG. 6B shows the state in which, in the screen showing the list of registered maps, the user has selected a file using the file selection button 601. A file name 610 displays the file name of the map file that has been selected from the file selection screen after the user has pressed the file selection button 601. A name 611 is the name for the map corresponding to the map file, and is input by the user. A region 612 is a region that is the attribute information assigned to the map, and displays, for example, a dropdown list for selecting a region. In addition to "unassigned", the region names for the regions that the device management device 101 manages, that is the region names that are displayed in the region list in FIG. 5A, are listed in the dropdown list of the region 612. Note that in the case in which a region has not been registered in the device management device 101, that is, in the case in which it does not exist in any row other than "unassigned" in the data base table in the Table 1, the drop down list will not be displayed.

Upon detecting that an add button 613 has been pressed by the user, the device management device 101 confirms that the file that has been selected by the user is in a format that is useable as a map. In the case in which the file is in a usable format, the device management device 101 saves the map file on the external storage device 307, and saves the information related to the map in a database along with the information that has been input to the name 611 and the region 612. Note that the storage destination for the map file may also be a file system of a host that is operated by the device management device 101. In the case in which the region is not registered in the device management device 101, that is, in the case in which it does not exist in any row other than "unassigned" in the data base table in the Table 1, the device management device 101 sets the RegionId for the map information to the RegionId for "unassigned". In contrast, in the case in which the file is not in a format that is usable as a map, the device management device 101 displays a message to this effect on the screen.

Table 3 is one example of a table for the database that stores the map information. The items that are shown in the column names in the Table 3 and the values therefor are stored in the database that stores the map information. The map information is managed by the map management unit 410.

TABLE 3

| Column Name | Definition |
| --- | --- |
| MapId | uniqueidentifier, Primary Key |
| Name | nvarchar (200) |
| Filename | nvarchar (100) |
| Path | nvarchar (300) |
| MapType | Int |
| RegionId | uniqueidentifier, Foreign Key |

The MapId is an identifier that uniquely identifies each map. Name is the name of the map. The value for Name is the value that the user has input to the name 611 on the new map registration screen (FIG. 6B). RegionId and MapType are the attribute information that are assigned to the map information. The RegionId is an ID for uniquely identifying a region. The value for the RegionId is the value corresponding to the region that the user has selected in the region 612 on the new map registration screen. Filename is the file name for the map. The value for the Filename is the value corresponding the file name 610 that has been selected by the user. Path indicates the location in which the map file has been stored, and is a path inside the file system of the device management device 101. MapType is the format of the map file. The value stored in the MapType is, for example, a value such as the ones below, which show whether the file is a file having either two-dimensional or three-dimensional information:

0: two-dimensional image file

1: three-dimensional modelling file.

Note that in the present embodiment, an example is explained for the case in which a MapType that has three-dimensional information is only a three-dimensional modeling file for performing a VR display. However, it may also be a three-dimensional image file for displaying a three-dimensional image on an LCD.

Figure 7:
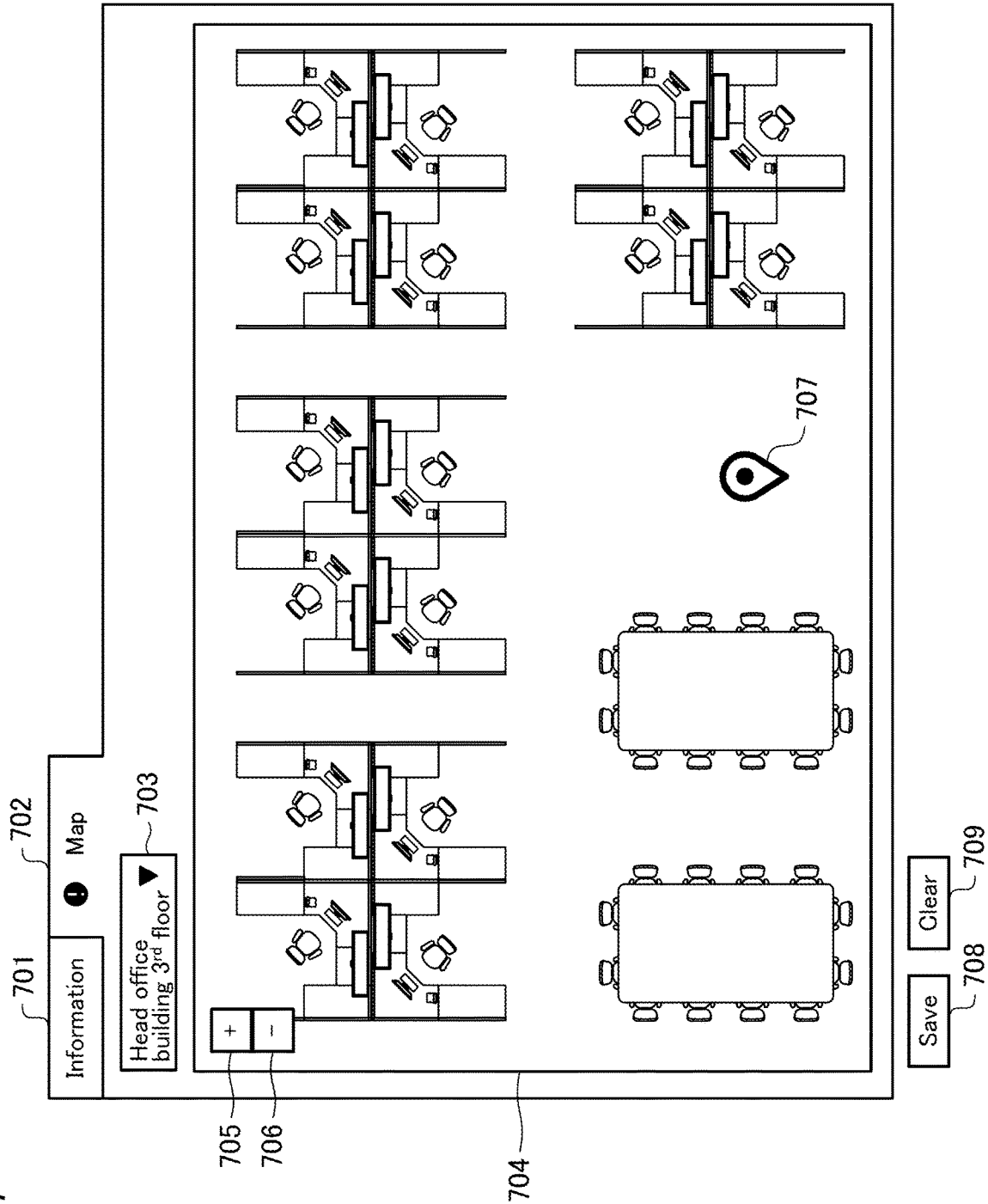
FIG. 7 is a diagram showing one example of a screen for performing the assignment of a map to a device.

FIG. 7 is a diagram showing one example of a screen for performing the assignment of a map to a device. The screen for performing the assignment of a map to a device is displayed on the detailed information display screen for the device. An information tab 701 and a map tab 702 are tabs on the detailed information display screen for the device for switching between the display of an information screen that displays device information and a map screen. Upon the selection of the information tab 701, an information screen is displayed that displays the device information such as the device name, the manufacturer name, the product name, the address, and the like. Upon the selection of the map tab 702, a screen, which is shown in FIG. 7, is displayed for performing the placement operation for the device on the map.

In the case in which a map has not be assigned to a device, the device management device 101 displays information that indicates that the map is unassigned in the map tab 702 (for example the "!" symbol). A map selection list 703 is a dropdown list for selecting a map. The device management device 101 displays maps that have been linked to the same region as the region to which a device belongs in the map selection list 703. In this manner, control such that a device is placed on the map for the corresponding region is made possible by narrowing down the targets for the placement operation based on the region. Upon detecting a change to the map selection by the user in the map selection list 703, the device management device 101 displays the map image for the selected map in a display region 704 in a display format according to the format of the map (MapType). FIG. 7 shows an example in which a map for which the MapType is 0 (a two-dimensional image file) has been selected, and a two-dimensional image is displayed.

An enlargement button 705 is a button for enlarging the display of the map image. A reduction button 706 is a button for reducing the display of the map image. A marker 707 is a marker that indicates the position of the device on the map. The marker 707 moves within the map image based on operations in which the user uses a pointing device such as a mouse or the like. A save button 708 is a button for saving the placement of the device on the map. Upon detecting that the save button 708 has been pressed by the user, the device management device 101 associates the coordinate information that shows the map being displayed and the marker 707 with the device and saves this (Table 4). At the same time, the device management device 101 associates and saves the RegionID, the MapID, and the user identifier.

A clear button 709 is a button for clearing the placement of the device on the map. Upon detecting that the clear button 709 has been pressed by the user, the device management device 101 stops displaying the marker 707 that is displayed on the map. Upon detecting that the save button 708 has been pressed in the state in which the marker 707 is not displayed, in the case in which the association between the device and the map are stored in the database, the device management device 101 deletes this. Upon detection that an arbitrary location within the display region 704 has been clicked in the state in which the marker 707 is not displayed, the device management device 101 displays the marker 707 at the position that has been clicked.

Table 4 is one example of a table for the database that stores the assignment of the maps to the corresponding devices. The items that are shown in the column names and the values therefor in the Table 4 are stored in the database that stores the map assignments for the devices, that is, in the database that stores the correspondence relationship between the devices and the maps. The table of the database that is shown in the Table 4 is saved by the device management device 101 detecting that the save button 708 has been pressed by the user. The information for the assignment of the maps to the devices is managed by the placement management unit 414.

TABLE 4

| Column Name | Definition |
| --- | --- |
| MapId | uniqueidentifier, Foreign Key |
| DeciveId | uniqueidentifier, Foreign Key |
| X | Int |
| Y | Int |
| Z | Int |

MapId is an identifier for uniquely identifying the map, and corresponds to the MapId for the map information (Table 3). RegionId is an identifier for uniquely identifying a device, and corresponds to the DeviceId for the management target device information (Table 2). X, Y, and Z are values that show the coordinates for the position of the placement of the device on the map. Note that in the case in which the map is a two-dimensional image, Z, which represents height, is not necessary. Note that although in the present embodiment, an example has been explained in which the correspondence relation information for the devices and the maps that is shown in the Table 4 and the device information in the Table 2 are managed separately, the information that is shown in the Table 4 may also be managed as a portion of the device information.

When the device information that is shown in FIG. 7 is displayed, the device management device 101 determines whether a row that includes the DeviceId for the device being displayed exists the table shown in the Table 4. In the case in which a row including the DeviceId for the device that is being displayed exists in the table shown in the Table 4 exists, the map on which the device is placed is displayed in the map tab 702 based on the Table 4. Specifically, the device management device 101 displays the map data that is indicated by the MapId saved in the table in the display region 704, and the marker 707 is displayed at the position that is shown by the saved coordinate data (X, Y, Z).

In contrast, in the case in which a row including the DeviceId for the device to be displayed does not exist in the table shown in the Table 4, the device management device 101 searches for the map to be displayed based on a combination of the user information and region information for the device. In this context, in the case in which a map has not been assigned to a device, the map that should be displayed first in the display region 704 is the map in which a device corresponding to the same RegionId as the device displaying the device information has been most recently placed. It is thereby possible to omit the step of selecting and displaying a map when placing devices on the same map successively. Specifically, the device management device 101 searches for a combination in which the user identifier and the Region Id for the device for this time match from among, for example, the combination of RegionIds, MapIds, and user identifiers that have been saved when registering the placement of another device on the map. In the case in which a combination was saved wherein the user identifier and the RegionId of the device for this time match, the device management device 101 displays the map that is shown by the MapId within this combination in the display region 704. The device management device 101 is thereby able to automatically display a map that a user has set to a device having the same RegionId as the last time. In addition, the map that should be displayed first in the display region 704 in the case in which a map has not been assigned to the device may also be the map for which the placement operation for the device to the map was performed the last time. The device management device 101 stores the map that was assigned to the previous device, and displays this.

FIG. 8 is a diagram showing one example of a display screen for a management target device list in the device management device 101. The device list screen displays a dropdown list 802 for selecting a display target device, and a device list table 801 that displays a list of devices that have been selected as display targets. The dropdown list 802 is a dropdown list for limiting the devices that will be displayed in the device list table 801. Options that display device groups and regions that have been set by the user, or all of the devices are listed in the dropdown list. For example, in the case in which the user has selected the region "Portugal", which is a region of the dropdown list 802, the device management device 101 displays devices for which Portugal is set as the region in the device list table 801.

The device list table 801 is a table that displays the management target devices. For example, the device name, product name, IP address, installation location, and the region are displayed in the device list table 801. Furthermore, in the case in which a map has already been assigned to a device, a mark that indicates that the map has already been assigned is displayed in the device list table 801 so that the user is able to confirm at a glance the devices for which maps have been assigned. For example, the device management device 101 displays a mark that suggests that the map has already been assigned on the left of the display of the installation location (for example the letter "i" inside of a circle). Upon detecting that the cell for an installation location on the display has been clicked by a user, the device management device 101 opens the detailed information display screen for the device from FIG. 7 in the state in which the "map" tab has been selected. The processing for when the "map" tab is displayed is as was explained above. Upon detecting that the cell for a device name in the device list table 801 has been clicked by a user, the device management device 101 displays the detailed information display screen for the device that has been selected in the state in which the information tab 701 has been selected. In addition, upon detecting that a cell for an installation location in the device list table 801 has been clicked by a user, the device management device 101 displays the detailed information display screen for the device that has been clicked on in the state in which the map tab 702 has been selected. Note that in the case in which the map tab 702 has been selected, the screen for performing the assignment of the map to a device that is shown in FIG. 7 is displayed.

Figure 9:
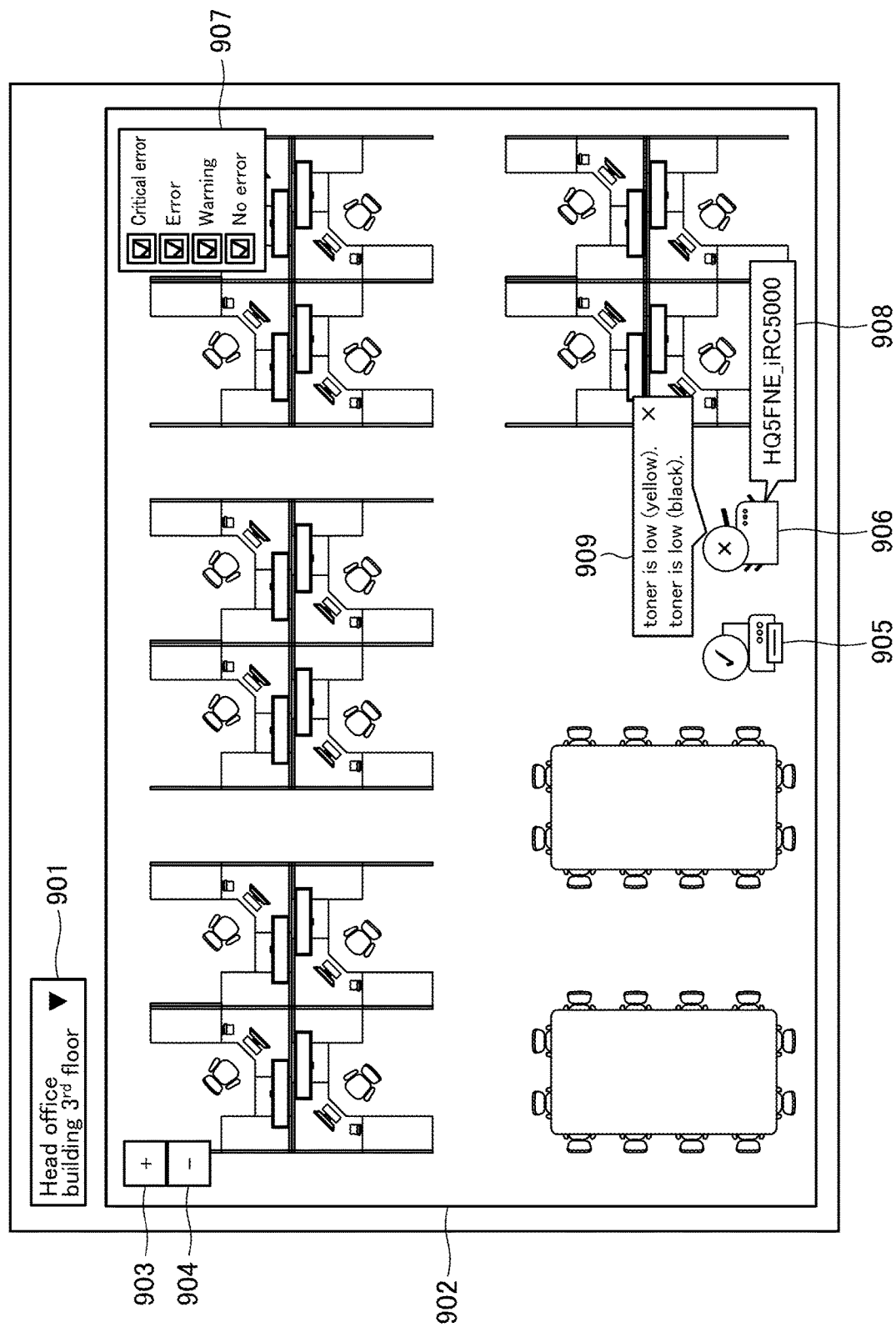
FIG. 9 is a diagram showing one example of a screen for displaying a device that has been linked with a map.

FIG. 9 is one example of a screen for displaying a device that has been linked with a map. A map that has been selected by the user from a dropdown list 901 for map selection is displayed in a display region 902. That is, upon detecting a change by a user to the selection in the dropdown list 901, the device management device 101 displays the map that the user selected in the display region 902. The image for the map selected in the dropdown list 901, an enlargement button 903, a reduction button 904, and a check box 907 are displayed inside the display region 902. Furthermore, in the case in which devices exist that have been assigned to the selected map, icons showing the devices (a device 905, and a device 906) are displayed.

The enlargement button 903 is a button for enlarging the display of the map image inside the display region 902. The reduction button 904 is a button for reducing the display of the map image inside the display region 902. The device 905 and the device 906 are icons showing the devices that have been associated with map that is being displayed. The device management device 101 displays icons for each device on the map based on the position of the coordinates that are saved in the table of the database in the Table 4. The icons that are displayed may also be made to differ depending on the type or the state of the device. For example, in FIG. 9, the device 905 indicates a device with the device type that is a printer, and that the printer is in a normal state. In addition, the device 906 indicates a device with the device type that is a multi-function machine, and that the multi-function machine is in an error state. Note that a common icon may be used for all of the devices, or the icons may also differ for each product. In addition, although the status is shown in FIG. 9 using marks (a "✓" or a "X"), the display is not limited thereto, and the case for regular operations and the case of an error may be differentiated by the color of the icon, or by having just the error icon flash.

Upon detecting that a pointing device such as a mouse or the like is on top of a device icon, the device management device 101 displays a popup including the information for this device. The information for the device is displayed in the popup, and for example, in a popup 908, the device name is displayed, and in a popup 909, information showing the details of an error is displayed. In addition to these, the product name and IP address for the device may also be displayed in the popup. In addition, a popup may also be made to be displayed when it is not the case that it has been detected that a pointing device is on top of the device icon, but rather the case in which a device icon has been selected (for example, in the case in which a double click has been performed).

The check boxes 907 are check boxes for designating the conditions for limiting (filtering) the device icons to be displayed according to the state of the devices. Upon detecting a change to the selection of a check box by a user, the device management device 101 performs filtering by performing control such that only the devices in states that have been checked off in the check boxes 907 are displayed on the map. For example, in the case in which "no error" has not been checked off, the device management device 101 does not display the device 905, for which the state is "no error".

Figure 10A:
FIGS. 10A to 10D are figures showing one example of images for a device that has been anthropomorphized.
Figure 10B:
Figure 10C:
Figure 10D:

It is also possible to display the icons according to the type and state of the device that is placed on the map as icons other than device icons, such as anthropomorphized images, or the like, instead of the device icons that show the device 905 and the device 906. FIGS. 10A to 10D are diagrams showing examples of icons for anthropomorphized devices. FIG. 10A is an icon for an anthropomorphized device for the case in which the state of the device is no error. FIG. 10B is an icon for an anthropomorphized device for the case in which the state of the device is a warning. FIG. 10C is an icon for an anthropomorphized device in the case in which the state of the device is an error. FIG. 10D is an icon for an anthropomorphized device in the case in which the state of the device is a critical error. The no error state shows a person who appears to be happy, in the case of a warning a person who appears to be troubled is shown, in the case in which an error is occurring, a person who appears to be angry is shown, and in the case in which a critical error is occurring, a person who looks confused is shown along with a "?: question mark".

Examples are explained in FIG. 9 to FIG. 10D for the case in which a two-dimensional map is displayed. However, it is also possible to display devices in the same manner even on a three-dimensional map. For example, in the case in which the MapType (the format of the map file) that is managed in the Table 3 as the attribute for the map that is being used is a "1" (a three dimensional modeling file), it is possible for the user to view virtual displays such as a VR or the like using this map by wearing a head mounted display or the like. When doing so, the display of the device that is being displayed on the three-dimensional map is also displayed using a three-dimensional (3D) icon. The 3D icon may take the form of a device, or it may also be a 3D expressed avatar that is able to express emotions in which the device has been anthropomorphized or imagined as an animal. That is, in the present embodiment, it is possible to manage the values indicating the region and drawing space (two-dimensional, three-dimensional, or the like) that serve as the attributes for each map being used, and to optimize the possibility of device placement according to these attributes, and the display state of the device with respect to the device placement on the map.

Figure 11:
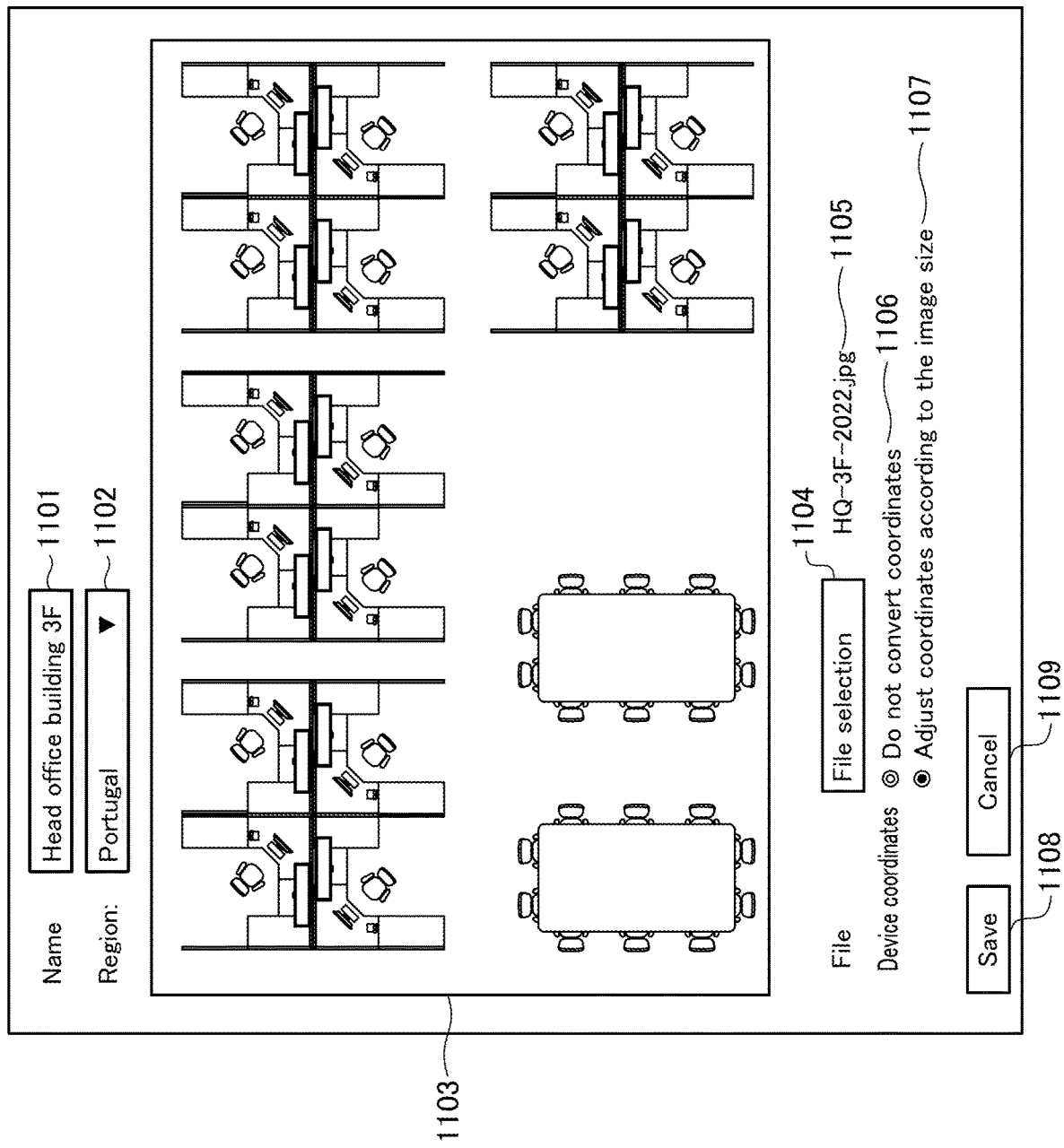
FIG. 11 is a diagram showing one example of an editing screen for a map.

FIG. 11 is a diagram showing one example of a map editing screen. Upon detecting that a cell for a map name has been clicked by a user in the map list table 602 in FIG. 6A and FIG. 6B, the device management device 101 displays the map editing screen. The map editing screen displays a map name 1101, a region 1102, a map image 1103, a file selection button 1104, a file name 1105, a do not convert coordinates button 1106, an convert coordinates button 1107, a save button 1108, and a cancel button 1109. The map editing screen is displayed, for example, when processing is performed to replace the current map that is indicated by the map image 1103 with a new map that is indicated by the file name 1105.

The map name 1101 is a text box for inputting the name of a map. The region 1102 is a drop-down list for selecting a region for the map. Note that in the case in which a region is not registered in the device management device 101, the device management device 101 will not display it in the dropdown list for the region 1102. The map image 1103 is a region that displays an image for the map that is the editing target. The file selection button 1104 is a button for selecting a map file that is the new replacement. Upon detecting that the file selection button has been pressed by the user, the device management device 101 opens a file selection screen for an OS or a web browser, and prompts the user to select a file. The file name 1105 is a file name for the file that has been selected by the user using the file selection button 1104. The do not convert coordinates button 1106 and the convert coordinates button 1107 are radio buttons for setting whether or not to perform the conversion of coordinates for the device that has been placed on this map when exchanging the current image file for the map with the image indicated with the file name 1105. The do not convert coordinates button 1106 is a radio button that is selected in the case in which the selection of coordinates is not performed. In contrast, the convert coordinate button 1107 is a button that is selected in the case in which the coordinates are adjusted to fit the image size for the newly replaced map. Upon detecting that the save button has been pressed by the user, the device management device 101 executes the processing in the FIG. 12 that is to be described below. Upon detecting that the user has pressed the cancel button 1109, the device management device 101 transitions to the map list screen that is shown in FIG. 6A.

Figure 12:
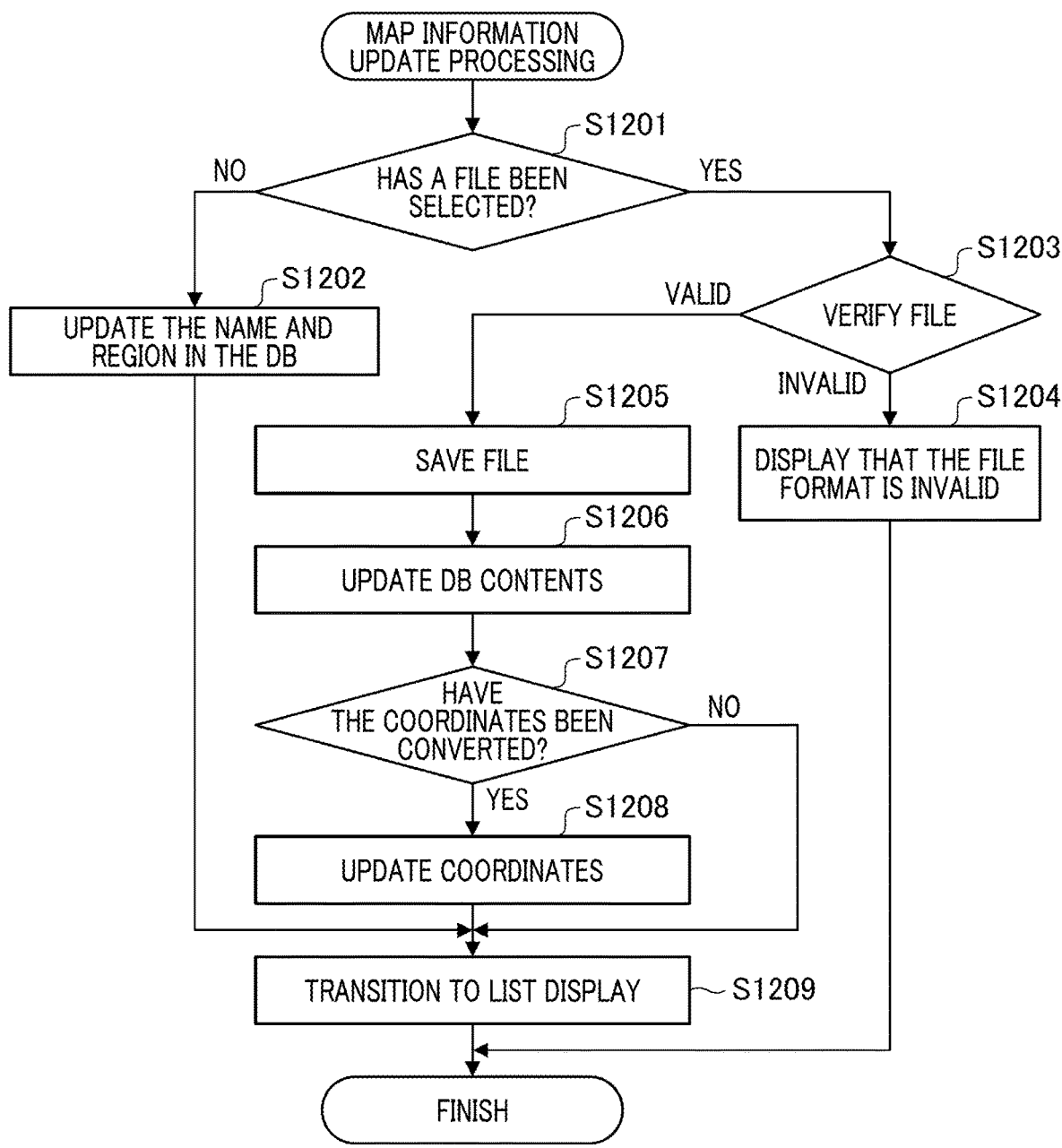
FIG. 12 is a flowchart showing file information update processing.

FIG. 12 is a flowchart showing the file information update processing. In FIG. 11, the file information update processing is processing that the device management device 101 executes when the save button 1108 being pressed by the user has been detected. Each processing that is shown in the flowchart in FIG. 12 is realized by the CPU 301 of the device management device 101 reading out and executing a program that is stored on a memory or a program that has been downloaded via a network on the RAM 302.

First, in step S1201, the device management device 101 confirms the presence or absence of a file selection by the user using the file selection button 1104. In the case in which there has not been a file selection, the device management device 101 performs the processing for step S1202. In contrast, in the case in which there has been a file selection, the device management device 101 performs the processing for step S1203.

In step S1202, the device management device 101 updates the information related to the update target map (the map displayed in the map image 1103) inside the table for the database that stores the map information for the Table 3 according to the editing contents on the map editing screen (FIG. 11). During this step, it is not necessary to update the map file itself, and therefore, the map name and region are updated according to necessity. Specifically, the device management device 101 replaces the value for the Name, which is the item that shows the map name in the Table 3, with the name that has been input into the map name 1101. In addition, the device management device 101 replaces the value for the RegionId, which is the item that shows the region in the Table 3, with the value for the region 1102. Upon completing the replacements with respect to the edited items, the device management device 101 updates and saves the database that stores the map information (Table 3). The device management device 101 that has finished the processing for S1202 next performs the processing for S1209, which will be explained below, and completes the present processing.

In the case in which there has been a file selection, in step S1203, the device management device 101 verifies whether or not the file with the file name 1105, which was selected using the file selection button 1104, is in a format that is useable as a map. As a result of the verification, in the case in which this is not a format that is usable as a map, the device management device 101 performs the processing for step S1204. In step S1204, the device management device 101 displays a message on the screen to the effect that the file that has been selected using the file selection button 1104 is not in a format that is usable as a map, and completes the present processing. In contrast, in the case in which the format is usable as a map, the device processing device 101 performs the processing for step S1205.

In step S1205, the device processing device 101 saves the file that has been selected using the file selection button 1104. The location to which this file is saved may be the external storage device 307, or it may also be a file system for a host that the device management device 101 operates. Next, in the step S1206, the device management device 101 updates the information relating to the update target map in the table for the database that stores the map information in the Table 3 according to the edited contents in the map editing screen (FIG. 11). Specifically, the device management device 101 replaces the value for the Name, which is the item indicating the map name in the Table 3, with the name that has been input into the map name 1101. In addition, the device management device 101 replaces the value for the Filename, which is the item indicating the file name in the Table 3, with the value for the file name 105, that is, with the file name for the file that was saved during step S1205. In addition, the device management device 101 replaces the value for the Path, which is the item indicating the path for the map file, with the path for the file that was saved in step S1205. In addition, the device management device 101 replaces the value for the RegionId, which is the item indicating the region in the Table 3, with the value for the region 1102. In addition, the device management device 101 replaces the value for the MapType, which is the item indicating the map type in the Table 3, based on the format for the file with file name 1105. Upon completing the replacements for the edited items, the device management device 101 updates and saves the database (the Table 3) that stores the map information.

In step S1207, the device management device 101 confirms the presence or absence of a coordinate conversion based on the selection of the do not convert coordinates button 1106 or the convert coordinates button 1107 on the editing screen (FIG. 11). In the case in which the do not convert coordinates button 1106 has been selected, the device management device 101 does not convert the coordinates, and performs the processing for step S1209. In contrast, in the case in which the convert coordinates button 1107 has been selected, the device management device 101 performs the processing for step S1208.

In S1208, the device management device 101 performs the coordinate conversion processing. During the coordinate conversion processing, the device management device 101 updates the values for the coordinates that indicate the position of a device in the map with respect to the editing target map in the table for the database that stores the map assignments for the devices (Table 4). The editing target map in the Table 4 is specified based on the MapId. In the case in which the map is two-dimensional, the X, and Y coordinates are updated, and in the case in which it is three-dimensional, the X, Y, and Z coordinates are updated. For example, the device management device 101 updates the values for each of the coordinates indicating the position of the network device according to the ratio of the lengths of each side of the map image before the conversion and the map image after the conversion. Specifically, in the case in which the X value is updated, the device management device 101 multiplies a value in which the size of the X direction of the new map has been divided by the size of the X direction of the original map by the X value before editing, and the result of this calculation is made the new X value. Updating the Y and Z values is also performed using the same calculations. In addition, in the case in which the direction of the map before the replacement of the map image and after the replacement are different, the values for each of the coordinates that indicate the position of the network device are also updated according to the rotation of the image. Upon completing the updates for the coordinates, the device management device 101 performs the processing for the step S1209. During the step S209, the device management device 101 displays the map list display screen that is shown in FIG. 6A, and completes the present processing.

As has been explained above, in the present embodiment, it is possible to limit the maps that can be selected when assigning a map to a device to maps having the same attribute values as the device attribute values by defining the map information and the device information with shared attribute information. It is thereby possible to perform control such that devices for the regions corresponding to the map regions are placed. Therefore, even in the case in which there is a large number of maps and devices, it is possible to lighten the workload for the user such as assigning the maps to devices, and the like. In addition, it is also possible to inhibit the possibility of placing devices on maps for different regions.

Second Embodiment

In the first embodiment, an example has been explained in which common attribute information is assigned to the device information and the map information. In the present embodiment, an example will be explained in which, in addition to the device information and the map information, common attribute information is also assigned to the user information. In the following explanation, the differences from the first embodiment will be explained, while the same reference numerals will be attached to configurational elements that are the same as those in the first embodiment, and explanations thereof will be omitted.

Figure 13:
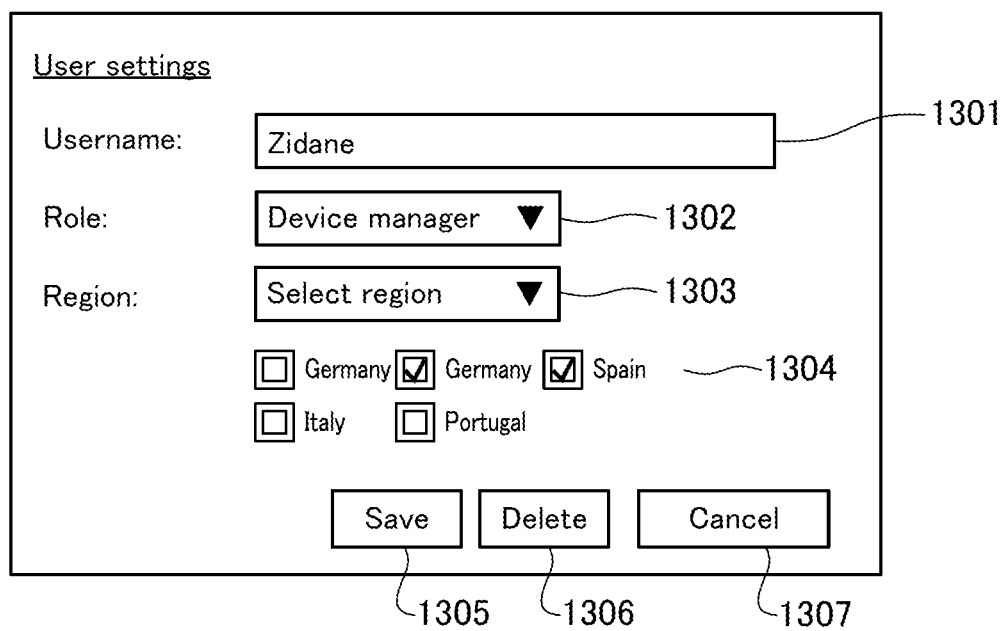
FIG. 13 is a diagram showing one example of a user setting screen.

FIG. 13 is a diagram showing one example of a user setting screen for the device management device 101. It is possible to add users or edit the user information on the user setting screen. The user setting screen displays, for example, a username 1301, a role 1302, a select region button 1303, check boxes 1304, a save button 1305, a delete button 1306, and a cancel button 1307.

The username 1301 is a text box for inputting a username to be used when logging into the system or the like. The role 1302 is a dropdown list for selecting the authority of the user. For example, "system manager" and "device manager" are selectable as the role of the user. Users who have the role of "system manager" are able to perform the addition, editing, and deletion of users, and the addition, editing, and deletion of regions. However, they are not able to perform the addition and editing of device information. A user who has the role of "device manager" is able to perform the addition, and editing of device information, but is not able to perform the addition, editing, and deletion of users, or the addition, editing, and deletion of regions. The authority to add and edit device information also includes the authority to add and edit the maps to be assigned to devices. Note that the "system manager" may also be made able to perform the addition and editing of device information, and it may also be made possible to set a role that has authority such that the addition and editing of all of the device information, the user information, and the regions.

It is possible to select the region settings for the user using the select region button 1303 and the check boxes 1304. The select region button 1303 and the check boxes 1304 are displayed in the case in which a region is set as attribute information in the device management device 101, and "device manager" has been selected as the role 1302. In the case in which a region is not set as attribute information in the device management device 101, or in the case in which "system manager" has been selected as the role in the role 1302, the UI parts of the select region button 1303 and the check boxes 1304 are not displayed.

It is possible to select one of "arbitrary region" and "region selection" for the settings for the select region button 1303. In the case in which "arbitrary region" has been selection, it becomes impossible to use the check boxes 1304 for selecting the region. In the case in which "select region" has been selected, it is possible to select the region to which the user belongs in the check boxes 1304 for selecting a region. The region names other than "unassigned" from the table for the database that stores the information indicating the regions (Table 1) are listed together with checkboxes for selections in the check boxes 1304.

In the case in which "arbitrary region" has been set in the select region button 1303, it is possible for the user for which "arbitrary region" has been set to access all of the device information and map information. Note that in the case in which a region is not set as attribute information in the device management device 101, or in the case in which "system manager" has been selected as the role using the role 1302, the region settings for the user are the same as the case in which "arbitrary region" has been selected. Therefore, users who have the role of "system manager" are able to access all of the devices and maps.

In the case in which "select region" has been selected using the select region button 1303, the user selects the region to associate with the user information using the check boxes 1304. It is possible for a user to belong to a plurality of regions. A user who belongs to a region is able to access the device information and the map information that belong to the region to which this user belongs. For example, in the case of the user shown in FIG. 13 (a user who has the role of "device manager", and belongs to the regions "France" and "Spain"), the user is able to access the devices and maps that are linked to the regions "France" and "Spain".

Upon detecting that the save button 1305 has been pressed by a user, the device management device 101 saves the user information to the database in accordance with the settings on the editing screen for the user information. For example, a username, a user ID for uniquely identifying a user, information relating to the user's authority, information for the region to which the user belongs, and the like, are included in the user information.

The delete button 1306 is a button that is displayed when editing the user information, and is not displayed when adding a new user. Upon detecting that the delete button 1306 has been pressed by the user, the device management device 101 displays a dialogue to confirm the execution of the deletion of the user information that is displayed on the editing screen for the user information. In addition, upon detecting the confirmation of the deletion by the user, the device management device 101 deletes this user information from the database. Upon detecting that the cancel button 1307 has been pressed by the user, the device management device 101 discards the user inputs, and finishes the display of the editing screen for the user information. Upon completing the display of the editing screen for the user information, the device management device 101 transitions to, for example, the user list screen.

The processing of the device management device 101 for the case in which a region is set in the user information, that is, for the case in which the region setting for the user is not "arbitrary region", will now be explained. In the case in which a region is set in the user information, the device management device 101 displays only the regions linked to the user performing the operation as region candidates when a map is created, and as region candidates when device information is registered. For example, the device management device 101 displays only the regions to which a user belongs in the dropdown list of the region 612 for selecting the region when creating a map in FIG. 6B. In addition, in the case in which a region is set in the user information, the device management device 101 displays only maps in which regions that are linked to the user performing the operation have been assigned as candidates for the map selection on the maps when selecting a map. For example, when performing the assignment of a map to a device, the device management device 101 displays only the maps in which the same regions as the regions to which the user belongs in the map selection list 703 have been set. The device management device 101 displays only maps for which regions have been set that are the same as the regions to which the user belongs in the dropdown list 901 for use in map selection to select a map to be displayed on the map display screen (FIG. 9).

In the case in which a region has been set in the user information, when displaying a device, the device management device 101 displays only the devices that correspond to the region that is linked to the user performing the operation. For example, when displaying the management target device list (FIG. 8), the device management device 101 displays only the devices linked to the regions that have been set by the user. Furthermore, only the regions to which the user belongs are displayed as the options for the region in the dropdown list 802 for limiting the device to be displayed.

As has been described above, according to the present embodiment, it is possible for the device management device 101 to limit the selection candidates for the region and map, and device according to the regions that are linked to the user. It is thereby possible to reduce the workload of the user when assigning maps to devices, or the like, even in the case in which there is a large number of maps and devices. In addition, it is also possible to inhibit the possibility of placing a device on a map for which the region is different.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-037502, filed Mar. 10, 2022, which is hereby incorporated by reference herein in its entirety.

What is claimed is:

1. A management device that manages a network device, the management device comprising:
a memory storing instructions; and
a processor that executes the instructions to:
manage map information by assigning attribute information thereto;
manage information for a network device that is a management target by assigning attribute information thereto;
manage user information by assigning attribute information thereto;
perform control, when map information is selected to become a placement target for a placement operation for a network device in relation to a map, to prevent selection of map information that has been assigned attribute information that does not correspond to attribute information for the network device that is the management target;
display information for a network device on a map based on the results of the placement operation using selected map information that has been selected by a user;
perform control, when the user is selecting map information, to select a map that corresponds to the selected map information that was assigned attribute information corresponding to the attribute information that was assigned to the user information corresponding to the user; and
perform control, when the user performs an operation for selecting a network device, to select a network device that corresponds to information for a network device that has been assigned attribute information corresponding to attribute information that was assigned to user information corresponding to the user.

2. The management device according to claim 1, wherein the attribute information that is assigned to the map information and the information for the network device are items indicating regions, and values therefor.

3. The management device according to claim 1, wherein the processor, when displaying a map on which a network device has been placed:
displays a state of the network device; and
filters network devices to be displayed on the map based on the state of the network device.

4. The management device according to claim 1, wherein the processor associates information for network devices, and saves map information corresponding to a map on which a network device corresponding to this information for a network device has been placed, and information indicating the position of this network device.

5. The management device according to claim 4, wherein the processor, when displaying a list of maps, displays a number of network devices placed on each map based on the associated map information and the information for network devices.

6. The management device according to claim 1, wherein the processor, in a case where a map image that is included in the map information is replaced, updates information indicating positions of network devices placed on the map corresponding to the map information according to a ratio of lengths of each side of the map image before replacement and the map image after replacement.

7. The management device according to claim 1, wherein the attribute information that is assigned to the map information is items that indicates whether or not a map is a three-dimensional map, and the values therefor.

8. A management device that manages a network device, the management device comprising:
a memory storing instructions; and
a processor that executes the instructions to:
manage map information by assigning attribute information thereto;
manage information for a network device that is a management target by assigning attribute information thereto;
manage user information by assigning attribute information thereto;
perform control, when map information is selected to become a placement target for a placement operation for a network device in relation to a map, to prevent selection of map information that has been assigned attribute information that does not correspond to attribute information for the network device that is the management target; and display information for a network device on a map based on the results of the placement operation using selected map information that has been selected by a user; and perform control, when the user performs an operation to assign attribute information to information for a network device or to map information, to select attribute information that has been attributed to user information corresponding to the user.

9. A control method for a management device that manages network devices, the method comprising:

managing map information by assigning attribute information thereto;

managing information for a network device that is a management target by assigning attribute information thereto;

managing user information by assigning attribute information thereto;

performing control, when map information that becomes a placement target for a placement operation for a network device in relation to a map is selected, prevent selection of map information that has been assigned attribute information that does not correspond to attribute information for the network device that is the management target;

displaying information for a network device on a map based on the results of the placement operation using selected map information that has been selected by a user;

performing control, when the user is selecting map information, to select a map that corresponds to the selected map information that was assigned attribute information corresponding to the attribute information that was assigned to the user information corresponding to the user; and performing control, when the user performs an operation for selecting a network device, to select a network device that corresponds to information for a network device that has been assigned attribute information corresponding to attribute information that was assigned to user information corresponding to the user.

10. A non-transitory storage medium storing a control program, for a management device that manages network devices, executable by a computer to perform a control method for the management device, the method comprising:

managing map information by assigning attribute information thereto;

managing information for a network device that is a management target by assigning attribute information thereto;

managing user information by assigning attribute information thereto;

performing control, when map information that becomes a placement target for a placement operation for a network device in relation to a map is selected, prevent selection of map information that has been assigned attribute information that does not correspond to attribute information for the network device that is the management target;

displaying information for a network device on a map based on the results of the placement operation using selected map information that has been selected by a user;

performing control, when the user is selecting map information, to select a map that corresponds to the selected map information that was assigned attribute information corresponding to the attribute information that was assigned to the user information corresponding to the user; and performing control, when the user performs an operation for selecting a network device, to select a network device that corresponds to information for a network device that has been assigned attribute information corresponding to attribute information that was assigned to user information corresponding to the user.

* * * * *